No. 869,306. PATENTED OCT. 29, 1907.
A. S. HUBBARD & W. A. TURBAYNE.
ELECTRICAL SYSTEM OF DISTRIBUTION.
APPLICATION FILED JUNE 20, 1906.
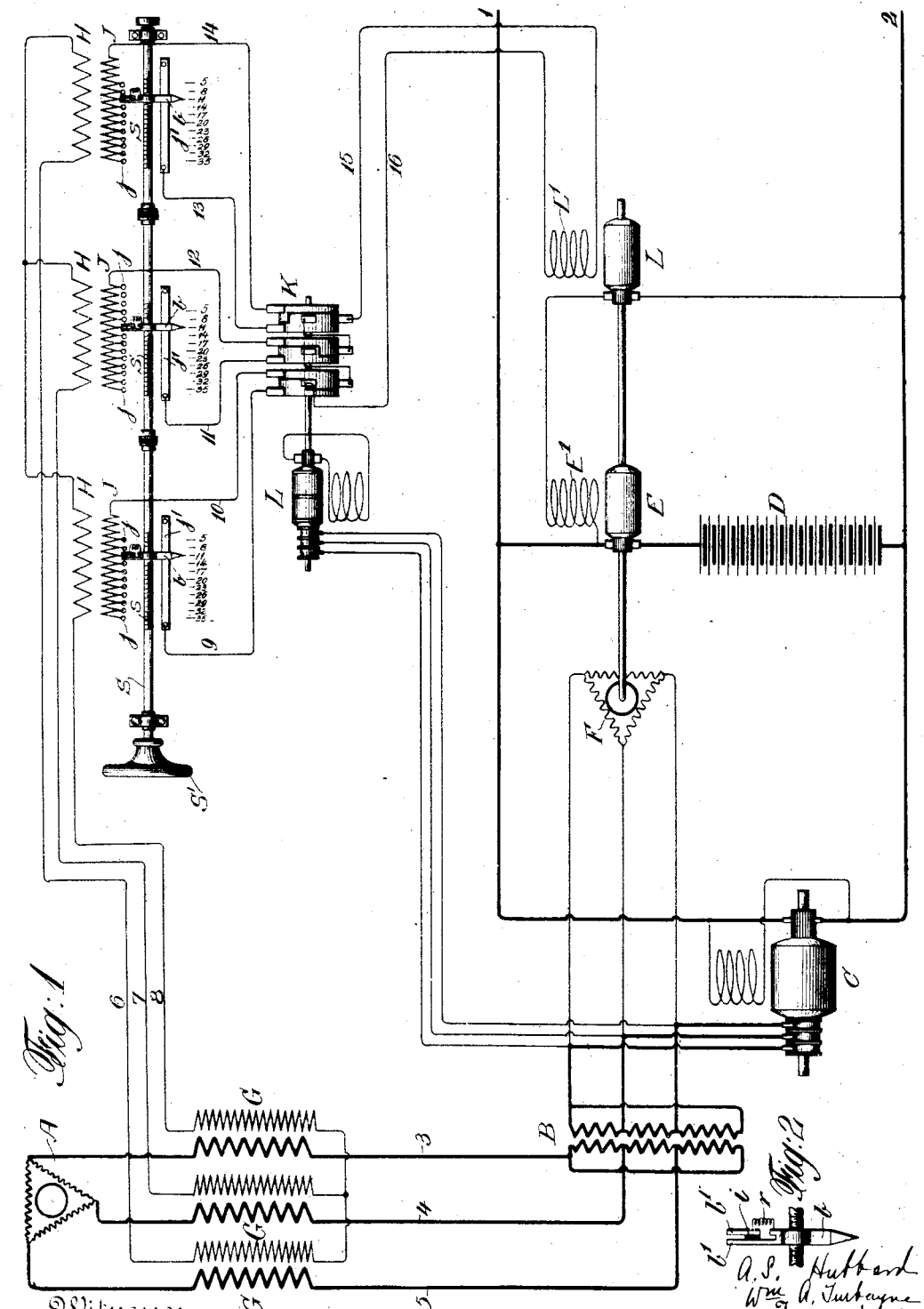

UNITED STATES PATENT OFFICE.

ALBERT S. HUBBARD, OF BELLEVILLE, NEW JERSEY, AND WILLIAM A. TURBAYNE, OF LANCASTER, NEW YORK, ASSIGNORS TO GOULD STORAGE BATTERY COMPANY, A CORPORATION OF NEW YORK.

ELECTRICAL SYSTEM OF DISTRIBUTION.

No. 869,306.

Specification of Letters Patent.

Patented Oct. 29, 1907.

Application filed June 20, 1906. Serial No. 322,529.

*To all whom it may concern:*

Be it known that we, ALBERT S. HUBBARD, a citizen of the United States, and a resident of Belleville, in the county of Essex and State of New Jersey, and WILLIAM A. TURBAYNE, a citizen of the United States, and a resident of Lancaster, in the county of Erie and State of New York, have invented certain new and useful Improvements in the Art of Electrical System of Distribution, of which the following is a specification.
Our invention relates to alternating current systems of distribution supplied by an alternating current generator and especially to the arrangement therein of a special character of transformer connected to a regulating circuit.
In alternating current systems it is desirable to maintain a reasonably steady load upon the alternating current generator and this has been effected by the use of a regulating battery and booster operating in the same manner as such batteries and boosters have been made to operate with reference to direct current circuits, there being between the battery and booster of the alternating current side of the system a rectifying device of some character, such as a rotary converter or a motor generator. It has been proposed to regulate the battery current, preferably by a regulation of the booster voltage, by means of changes of current on the main alternating current generator, and for this purpose an alternating current regulating circuit has been provided with suitable rectifying devices to regulate the booster field strength in accordance with changes of load on the main alternating current generator. We have applied our invention to such a system although in its broader phase it is not necessarily limited to this precise system.

Our invention consists in the provision in such a regulating circuit of a transformer—or where the circuit is a multiphase one, a plurality of transformers—which may be adjusted by the station attendant to vary the ratio between the primary and secondary windings of the transformer so that the regulating circuit may be adjusted for different values of regulation. Thus in the present instance we have applied our invention to a system having a three phase generator, and have added to a three phase regulating circuit whose current is governed by the current strength of the main generator and which contains a rectifier device to supply direct current for regulating the booster voltage, three transformers having their secondaries connected to three series of fixed contacts, and have mechanically connected three movable brushes which therefore may be simultaneously moved by the station attendant to vary the ratio of current transformation in the transformers so that the attendant may adjust the regulating circuit for any desired current strength on the main generator. The three movable brushes are each provided with sep-
arate contacts connected through an electrical resistance so that the secondaries will not at any time be
short circuited through the contacts, and a scale has
been provided so that the current strength of the main
generator corresponding to all positions of the movable
brushes may be clearly indicated.

Figure 1 of the drawings is a diagrammatic illustration of a preferred form of our invention; Fig. 2 shows one of the contact brushes of the transformer in a somewhat larger scale.

A is a main alternating current generator giving three phase currents.

B is a transformer which is preferably used in such systems to reduce the voltage of the current that is to be used for the rotary converter or motor generator. Connected to the secondary of this transformer is the alternating current end of a rectifying device C—in the present instance a rotary converter. The direct current end of the rotary converter C is connected in a battery branch containing the storage battery D and booster armature E. The work circuit of the system may be a direct work circuit connected to the conductors 1 and 2, or it may be an alternating current circuit connected to the conductors 3, 4, 5, or work circuits may be connected to both of these sets of conductors.

It is desirable to operate the booster at a substantially constant speed. In the present instance we have indicated a synchronous motor F connected to the secondary of the transformer B and mechanically connected with the booster armature.

In order to regulate the booster voltage a regulating circuit is provided, the current therein being primarily regulated by the series transformer G whose primaries are connected in the circuit of the main generator A, while the secondaries supply the current to conductors 6, 7 and 8 of the regulating circuit.

H, J represent respectively, primaries and secondaries of three transformers, the primaries being, through the conductors 6, 7, 8, connected to the secondaries of the transformers G, while the secondaries supply current through the conductors 9, 10, 11, 12 13 and 14 to a rectifying device K rotated at synchronous speed by the synchronous motor L. The transformers shown in the drawings are of that type in which the primary and secondary turns are turns of separate coils, but it is to be understood that this is not important to the present invention. The rectifying device K consists of three commutators in series, as indicated, so that the circuits fed by the three secondaries are connected in series and rectified in the circuit 15, 16. This latter circuit is, of course, a direct current circuit and has a substantially continuous current, the pulsations being almost eliminated by the addition of the three out of phase voltages. Since such a rectifier is well known and its specific character forms no part of the present invention it is not necessary to describe it further.

The current in the circuit 15, 16 is employed to supply current to the field coil L′ of a regulating dynamo, in the present case, a counter electro-motive force machine. The armature L of this machine is connected in series with the booster field winding E′, the two being in a shunt across the direct current side of the system. This manner of regulating the voltage of the battery booster is so well known and has been so frequently described in prior patents and applications that it is unnecessary for us to describe it more in detail. It is sufficient to say that the counter machine connected across the circuit in series with the booster field and regulated in accordance with changes of the system constitutes a means for supplying to the booster field the resultant of opposing potential differences and of varying that resultant in accordance with the needs of the system.

Returning now to the transformers H, J, it will be noted that the secondary of each of these transformers has its winding connected to a number of contacts $j$. In each case the conductors 9, 11 and 13 instead of being connected directly to the secondary J, as are the conductors 10, 12 and 14, are connected to a continuous contact $j'$. Each transformer completes the connection between the secondary and the continuous contact $j'$ and, therefore, completes a circuit to the secondary through the brush $b$, having one end split so as to form contacts $b'$ which are of insufficient width to bridge the space between adjacent fixed contacts $j$ and which at the other end engage the continuous contacts $j'$. The parts B′ are separated by insulation $i$ but are electrically connected through a high resistance $r$.

The three brushes $b$ are operated simultaneously by the shaft S rotated by hand wheel S′ and having threaded portions $s$ which pass through correspondingly threaded portions of the brushes $b$. In the present instance each brush at one end is formed with a point and adjacent to the line of movement of said point is a scale indicating the number of amperes upon the main generator corresponding to the various positions of the brush. Evidently, since all three brushes move together only one of these scales will be necessary, but it may be found desirable to employ all three so as to insure at any time that the three brushes are properly set.

The operation of the apparatus is as follows: Assuming the brushes $b$ to be set at any given position then the desired average load upon the main generator will cause a current to traverse the regulating circuit that will produce in the field winding L′ a current just sufficient so that the electro-motive force of armature L equals that across the direct current side of the system. An increase of that average load will cause an increased current from the secondaries of transformers G, an increased current from the secondaries J, an increased current in the field winding L′ and so a current on the booster field winding in a certain direction and of a value corresponding to the extent of the change of load on the generator A. A decrease of current in the main generator results in a decreased current in the coil L′ and, therefore, in a booster voltage opposite in direction to that before produced. If the operator desires to change the average load falling upon the main generator say from eleven amperes as indicated on the drawings, to say twenty amperes, the operator moves the wheel S′ until the brushes $b$ point to the figure 20. By doing this it will be seen that a greater number of turns of the secondaries J are included in the circuit, therefore reducing the ratio of transformation in the transformers H, J. Since the current in the primaries and the transformers G is not changed by this adjustment, the current in the secondaries of transformers G will not be changed nor will the current in the primaries H. The current, however, in the secondaries J will be decreased and therefore a given current in the coil H will have less regulating effect than before. In the embodiment of our invention illustrated and described the adjustment of the value of the regulation is, therefore, specifically an adjustment of the average load of the main generator, this adjustment not substantially varying the fineness of regulation. Where we refer generally to adjustment of the value of regulation, we, however, include the adjustment of the regulating circuit for either or any purpose.

While we have shown the contacts $b'$, $b'$ connected through a resistance $r$ it will be understood that the essential point with relation to this is that the connection between these brushes must comprise a circuit having a high opposition to current flow. In using the term resistance in the claims we intend to include not only mere ohmic resistance but counter electro-motive force devices as well. Again, in referring to the transformers H, J as three distinct transformers it is to be understood that it is not necessary that they should have three separate cores, a single core including all three sets of winding would be equally within our invention. We have shown the variation in turns applied to the secondary, but it will be understood that this is a mere matter of detail. It is immaterial whether the secondary is so employed or the primary.

What we claim as new, and desire to secure by Letters Patent, is:—

1. The combination of an alternating current generator, a direct current circuit, a rectifying device between the alternating current and direct current circuits, a battery connected to the direct current circuit, a regulating alternating current circuit and apparatus for controlling the battery current acted upon by the variations in said regulating circuit, a transformer in the regulating circuit, and means for adjusting the ratio between the primary and secondary turns of said transformer to adjust for different values of regulation.

2. The combination of an alternating current generator, a direct current circuit, a rectifying device between the alternating current and direct current circuits, a battery connected to the direct current circuit, a regulating alternating current circuit and apparatus for controlling the battery current acted upon by the variations in said regulating circuit, a transformer in the regulating circuit, means for adjusting the ratio between the primary and secondary turns of said transformer to adjust for different values of regulation, and means for indicating the value of regulation for which the transformer is adjusted.

3. The combination of an alternating current generator, a direct current circuit, a rectifying device between the alternating current and direct current circuits, a battery connected to the direct current circuit, a regulating alternating circuit and apparatus for controlling the battery current acted upon by the variations in said regulating circuit, a transformer in the regulating circuit, contacts connected to different points in one of the windings of the transformer, and mechanism adapted to connect one terminal of the circuit for said winding to any of said contacts to adjust for different values of regulation.

4. The combination of an alternating current generator, a direct current circuit, a rectifying device between the alternating current and direct current circuits, a battery connected to the direct current circuit, a regulating alternating current circuit and apparatus for controlling the battery current acted upon by the variations in said regulating circuit, a transformer in the regulating circuit, means for adjusting the ratio between the primary and secondary turns of said transformer to adjust for different values of regulation, and means for indicating the value of regulation for which the transformer is adjusted.

5. The combination of an alternating current generator, a direct current circuit, a rectifying device between the alternating current and direct current circuits, a battery connected to the direct current circuit, a regulating alternating current circuit and apparatus for controlling the battery current acted upon by the variations in said regulating circuit, a transformer in the regulating circuit, fixed contacts connected to different points in one of the windings of the transformer, a pair of contacts connected electrically through a resistance, means for moving said pair of contacts over said fixed contacts, and a connection between said pair of contacts and a terminal of the circuit connected to the transformer.

6. The combination of an alternating current generator, a direct current circuit, a rectifying device between the alternating current and direct current circuits, a battery connected to the direct current circuit, a regulating alternating current circuit and apparatus for controlling the battery current acted upon by the variations in said regulating circuit, a transformer in the regulating circuit, fixed contacts connected to different points in one of the windings of the transformer, a pair of contacts connected electrically through a resistance, means for moving said pair of contacts over said fixed contacts, a connection between said pair of contacts and a terminal of the circuit connected to the transformer, and means for indicating the value of regulation corresponding to various positions of the said pair of contacts.

7. A polyphase alternating current generator, a rectifying device connected thereto, a battery connected to the direct current end of the rectifying device, a polyphase regulating circuit and apparatus therein for controlling the battery current, transformers in different branches of said regulating circuit, and means for simultaneously varying the ratio of transformation in each of said transformers to adjust for different values of regulation.

8. A polyphase alternating current generator, a rectifying device connected thereto, a battery connected to the direct current end of the rectifying device, a polyphase regulating circuit and apparatus therein for controlling the battery current, transformers in different branches of said regulating circuit, a series of fixed contacts connected to different points in one of the windings of each of said transformers, and movable contacts each connected to one terminal of the circuit of one of said windings and engaging the series of fixed contacts, and a mechanical connection between said movable contacts.

9. A polyphase alternating current generator, a rectifying device connected thereto, a battery connected to the direct current end of the rectifying device, a polyphase regulating circuit and apparatus therein for controlling the battery current, transformers in different branches of said regulating circuit, a series of fixed contacts connected to different points in one of the windings of each of said transformers, and movable contacts each connected to one terminal of the circuit of one of said windings and engaging the series of fixed contacts, a mechanical connection between said movable contacts, and means for indicating the value of regulation corresponding to different positions of said movable contacts.

In testimony whereof, we have signed our names to this specification, in the presence of two subscribing witnesses.

ALBERT S. HUBBARD.
WILLIAM A. TURBAYNE.

Witnesses as to Hubbard:
EDWIN SEGER,
ANNA DALY.

Witnesses as to Turbayne:
EDMUND M. MAW,
HENRY A. MONIN.